United States Patent [19]

Horikawa et al.

[11] 4,315,883

[45] Feb. 16, 1982

[54] METHOD FOR FORMING CORROSION-RESISTANT LAYER AND SURFACE ELECTRICALLY CONDUCTIVE LAYER ON CABLE

[75] Inventors: Takahiro Horikawa; Yutaka Hibino; Seiichi Maki, all of Osaka, Japan

[73] Assignee: Sumitomo Electric Industries, Ltd., Osaka, Japan

[21] Appl. No.: 152,959

[22] Filed: May 23, 1980

[30] Foreign Application Priority Data

May 25, 1979 [JP] Japan .................................. 54-65146

[51] Int. Cl.$^{3}$ ........................... B29F 3/10; B05D 5/12

[52] U.S. Cl. .................................... 264/174; 427/118; 427/120; 427/122; 427/185; 427/195; 427/201; 427/355; 427/358; 427/369; 427/370; 427/371; 427/375; 427/376.1; 427/378; 427/393.5; 427/409

[58] Field of Search ............... 427/118, 120, 122, 185, 427/195, 201, 355, 358, 369, 370, 371, 375, 376.1, 378, 393.5, 409; 264/174

[56] References Cited

U.S. PATENT DOCUMENTS 1,250,128 12/1917 Belavich ............................. 118/106
2,022,009 11/1935 Rocca .................................. 118/106
2,044,970 6/1936 Candy ................................ 427/201
3,520,711 7/1970 Bish et al. ........................... 427/185
3,867,565 2/1975 Prentice et al. .............. 174/120 SC
4,174,243 11/1979 Magarian ............................ 118/106
4,244,985 1/1981 Graff et al. .......................... 427/185

*Primary Examiner*—Michael R. Lusignan
*Assistant Examiner*—Richard Bueker
*Attorney, Agent, or Firm*—Sughrue, Mion, Zinn, Macpeak and Seas

[57] ABSTRACT

A method and apparatus for forming an electrically conductive layer on a corrosion-resistant layer which covers a cable. The cable is passed through a powder accumulating tank in which are mixed an electrically conductive powder and binder powder so as to allow the mixed powder to initially adhere to the surface of the cable. The mixed powder is then pressed against the surface of the cable first at a cable outlet of the powder accumulating tank and then with a powder applying device in which an endless powder applying belt or cloth is rotated around the cable at a rotational speed dependent upon the linear speed of the cable. The surface of the cable is then heated to melt the binder powder and cause the electrically conductive powder to yet more firmly adhere to the surface of the cable. The cable is then cooled and wound.

9 Claims, 5 Drawing Figures

METHOD FOR FORMING CORROSION-RESISTANT LAYER AND SURFACE ELECTRICALLY CONDUCTIVE LAYER ON CABLE

BACKGROUND OF THE INVENTION

The present invention relates to a method and apparatus for forming an electrically conductive layer on a corrosion-resistant layer formed of plastic material such as polyethylene (PE) or polyvinyl chloride (PVC) which covers a cable.

The corrosion-resistant layer of a cable sheathed with metal such as lead or aluminum is, in general, electrically insulating. The corrosion-resistant layer serves not only to protect the metal sheath mechanically but also to prevent electrical or chemical corrosion of the metal sheath. If, during the use of the cable, the corrosion-resistant layer becomes defective, then the metal sheath may corrode by action of moisture entering through the defective corrosion-resistant layer. If the reaction is advanced, moisture may enter the inside of the cable through the metal sheath and decrease the insulation resistance of the cable. Therefore, it is desirable during the use of the cable to frequently inspect the corrosion-resistant layer to determine whether its structure is satisfactory.

In order to simplify this inspection, heretofore a method was employed utilizing a specific type of cable in which during the manufacture of the cable an electrically conductive layer is formed on the electrically insulating corrosion-resistant layer of the cable. With the electrically conductive layer formed on the corrosion-resistant layer, then the acceptability of the corrosion-resistant layer over the entire length of the cable can be determined by applying a voltage across the metal sheath and the electrically conductive layer.

In order to form the electrically conductive layer on the corrosion-resistant layer, heretofore the following method was employed. For a cable having a PVC corrosion-resistant layer, carbon powder or graphite powder was mixed with PVC powder to obtain an electrically conductive powder. The electrically conductive powder thus prepared was dissolved in a solvent such as methyl-ethyl-ketone to make an electrically conductive paint. The electrically conductive paint thus prepared was put in a paint tank and the cable passed through the electrically conductive paint to coat the cable with the paint. Thereafter, the solvent was allowed to evaporate to complete the formation of the electrically conductive layer on the PVC corrosion-resistant layer.

However, the conventional method is disadvantageous in the following points. It is difficult to form a uniform electrically conductive layer and accordingly, an electrically conductive layer actually formed has a tendency to peel off the cable. As the PVC powder is dissolved with a solvent, the corrosion-resistant layer is liable to crack. Furthermore, it is considerably troublesome to control the concentration of the electrically conductive paint and the working conditions. In addition, the solvent is hazardous and has a foul order which may make the environmental working conditions unsatisfactory. Moreover, the conventional method cannot be used with a PE corrosion-resistant layer because there is no suitable solvent therefor.

For a cable having a PE corrosion-resistant layer as described above, a method has been proposed in the art in which the cable is passed through electrically conductive PE powder to form an electrically conductive layer on the corrosion-resistant layer. However, the conventional method is disadvantageous in that it is rather difficult to make the powder adhere to the corrosion-resistant layer because its adhering properties are generally insufficient and it is still impossible with this method to form a uniform electrically conductive layer.

Accordingly, an object of the invention is to provide an electrically conductive layer which is uniform and which firmly adheres to the cable and which will not peel off the cable by employing a method in which electrically conductive powder mixed with binder powder is adhered to the surface of the corrosion-resistant layer of the cable then pressurized and heated so that it is firmly attached to the corrosion-resistant layer whereby the above-described drawbacks accompanying a conventional method are eliminated.

SUMMARY OF THE INVENTION

This, as well as other objects of the invention, are met by a method for forming a corrosion-resistant layer and a surface electrically conductive layer on a cable including the steps of providing mixed powder including conductive and binder powders in a powder accumulating tank and forming an accumulated powder layer therein, passing a cable through the accumulated powder layer to allow the mixed powder to adhere to the surface of the cable, pressing the mixed powder against the surface of the cable at a cable outlet of the powder accumulating tank, and heating the surface of the cable with a heating device so as to melt the binder powder to cause the electrically conductive powder to more firmly adhere to the surface of the cable. The surface of the cable can additionally be pressed with a powder applying device to more firmly adhere the powder to the surface of the cable.

Yet further, the objects of the invention are met by an apparatus for forming a corrosion-resistant layer and an electrically conductive layer on a cable comprising a powder accumulating tank having an inlet and outlet through which pass a cable with the cable in the tank passing through accumulated electrically conductive powder therein wherein the powder is allowed to adhere to the surface of the cable, means for pressing the powder against the cable at the cable outlet of the powder accumulating tank, powder applying means for pressing the powder against the cable with a powder applying cloth so as to cause the powder to more firmly adhere to the cable, heating means for heating without surface contact the surface of the cable so as to melt binder powder mixed with the electrically conductive powder, and cooling means for blowing air onto the surface of the cable for cooling the cable after it emerges from the heating means. The powder accumulating tank, powder applying means, heating means and cooling means are arranged in that order preferably as a series of linearly-arranged processing stations.

DESCRIPTION OF THE PREFERRED EMBODIMENTS

Figure 1:
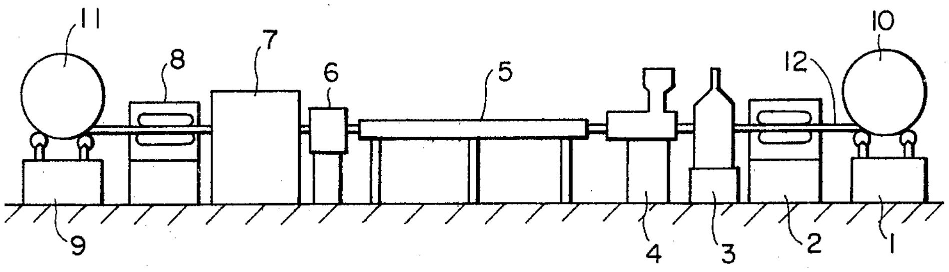
FIG. 1 is an explanatory diagram showing the arrangement of an apparatus for manufacturing a corrosion-resistant cable having an electrically conductive layer according to the invention.

A preferred embodiment of the invention will be described with reference to the accompanying drawings. FIG. 1 is an explanatory diagram for a description of a method of forming a PVC or PE corrosion-resistant layer on an aluminum-covered cable and an apparatus for practicing the method. An aluminum-sheathed cable 12 is wound on a drum 10 positioned on a supply stand 1 and is pulled out by a caterpillar type capstan 2. While passing through a paint bath 3, the cable 12 is coated with corrosion-resistant paint. Next, while passing through a plastic extruding machine 4, the cable 12 is covered with PVC or PE. That is, a PVC or PE corrosion-resistant layer is formed on the cable 12. The cable 12 thus coated is cooled while passing through a cooling water bath 5. A voltage of several kilovolts is applied to the cable 12 by a spark tester 6 to inspect the corrosion-resistant layer. Thereafter, the cable 12 passes through a surface electrically conductive layer forming device 7 in which an electrically conductive layer is formed on the corrosion-resistant layer of the cable. Finally, the cable is wound on a winding drum 11 on a winding stand 9 through another caterpillar type capstan 8.

For a lead-covered cable, a cloth tape or a reinforcing metal tape is wound on the cable and therefore it is unnecessary to coat the cable with corrosion-resistant paint.

In the above-described embodiment of the invention, the formation of the corrosion-resistant layer and the formation of the surface electrically conductive layer are carried out by a series of devices arranged in a single line. This is one of the significant features of the invention. The surface electrically conductive layer forming device of the invention can of course be used to form an electrically conductive layer on a cable on which a corrosion-resistant layer has been formed in advance.

Figure 2:
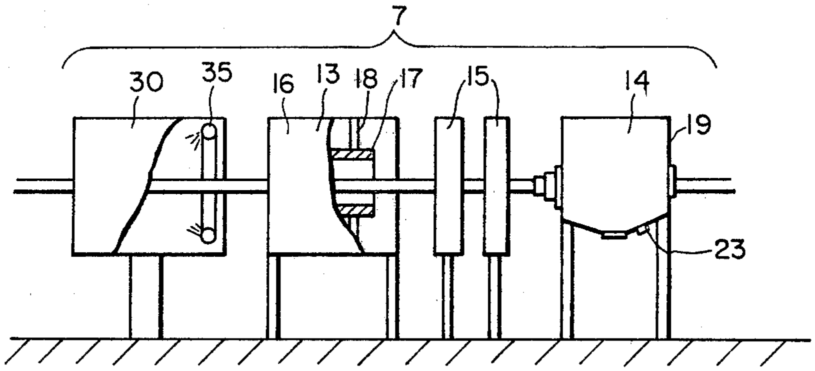
FIG. 2 is a side view showing a surface electrically conductive layer forming device used in the apparatus of FIG. 1.
Figure 3:
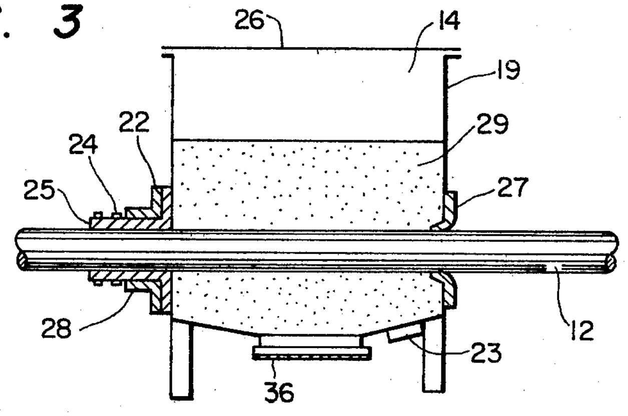
FIG. 3 is a sectional view showing a powder accumulating tank in the device in FIG. 2.

The surface electrically conductive layer forming device 7, as shown in FIGS. 1 and 2, is made up of a powder accumulating tank 14, a powder applying device 15 adapted to apply powder to a cable under pressure, a heating device 13, and a cooling device 50.

The powder accumulating tank 14 has a container 19 with an upper cover 26 through which electrically conductive powder is supplied to form an accumulated powder layer 29 in the container 19. The container 19 has an inlet 27 and an outlet 28 through which the cable can pass to allow it to pass through the accumulated powder layer 29. A vibrator 23 is provided on one side of the container 19 which operates to vibrate or tap the container 19. As the container 19 is vibrated at all times, the electrically conductive powder will adhere to the surface of the cable as it passes through the accumulated powder layer without sticking to the container 19 and without forming bridges therein.

A rubber packing 27 having a through-hole which has a diameter smaller than the outside diameter of the cable and a plurality of radially extending slits is provided at the cable inlet of the container to prevent the leakage of electrically conductive powder. A cylindrical hollow holder 22 made of rubber is provided at the cable outlet 28 of the container. A powder applying cloth pipe 25 is disposed in the holder 22 in such a manner that one end portion of the cloth pipe 25 extends outside of the front end of the cylindrical hollow holder 22. This end portion of the cloth pipe 25 is squeezed against the cable by a squeeze control device 24 made up of force bands. By means of the powder applying cloth pipe 25, the electrical conductive powder which adheres to the cable is firmly applied to the surface of the cable under pressure and excessive powder is removed from the cable.

Figure 4A:
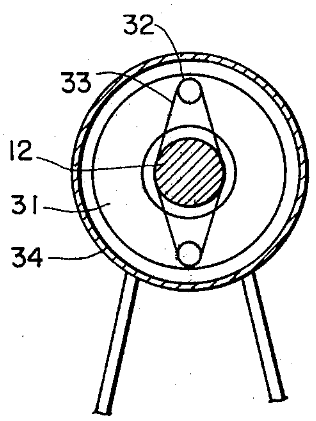
FIGS. 4A and 4B are sectional views showing the construction of a powder applying device used in the apparatus of FIG. 2.
Figure 4B:
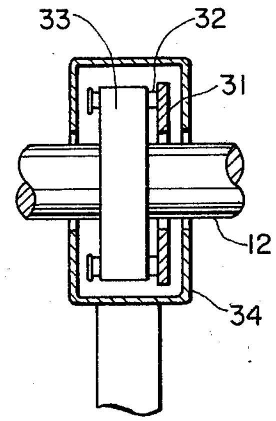

The powder applying device 15, as shown in FIGS. 4A and 4B, includes a frame 34 and a rotary unit 31 arranged in the frame 34. A pair of posts 32 are mounted on the rotary unit 31 in positions symmetrical with respect to the center of rotation of the rotary unit 31. An endless powder applying belt 33 is laid over the posts 32 with the sides of the belt pressing against the sides of the cable. When the rotary unit of the powder applying device is rotated while the cable is running, the electrically conductive powder adhering to the cable is pressed against the surface of the cable whereby the powder is made to more strongly adhere to the surface of the cable with the result that the electrically conductive layer is uniformly formed on the surface of the cable. A single powder applying device 15 may be sufficient for this purpose. However, it is preferable to use two such powder applying devices because the powder is thus made to more effectively and uniformly adhere to the cable and excessive amounts of the powder can be removed by the device 15 at the rear stage.

Furthermore, it is desirable that the powder applying device be rotated in proportion to the speed of the caterpillar type capstan 8 shown in FIG. 1. For this purpose, the speed of the powder applying device should be constant per unitary length of the cable. Therefore, irrespective of the speed of passage of the cable, the surface of the corrosion-resistant layer on the cable can be pressed uniformly by the powder applying device as a result of which the electrically conductive layer which is formed has a uniform electrical conductivity.

The heating device 13, as shown in FIG. 2, includes a frame 16 and a cylindrical heater 17 whose inside diameter is larger than the outside diameter of the cable 12 as it runs along the central axis of the frame 16. The heater 17 is supported by a supporting unit 18. The electrically conductive layer formed under pressure on the corrosion-resistant layer of the cable is heated without surface contact by the heater 17 as a result of which the binder in the electrically conductive powder is melted and therefore the electrically conductive powder, which may for instance be graphite powder, is made to firmly adhere to the surface of the cable.

The cooling device 30 has an air blowing ring 35 provided in a cylindrical frame 30. The air blowing ring 35 has a number of air blowing outlets for blowing air toward the cable after it was heated by the heating device 13 to quickly decrease the temperature of the cable to about 30° C.

For manufacturing a corrosion-resistant cable having an electrically conductive layer on its surface, electrically conductive powder such as graphite is mixed with binder powder and the mixture is put in the powder accumulating tank 19 forming an accumulated powder layer 29 therein. As shown in FIG. 1, a metal-sheathed cable is driven by the caterpillar type capstan 2 and a corrosion-resistant layer is then formed on the cable by the plastic extruding machine 4. Thereafter, the electrically conductive powder is adhered to the cable while the cable is passing through the accumulated powder layer 29. The powder thus attached is pressed against the surface of the cable by means of the powder applying cloth pipe 25 provided at the cable outlet of the powder accumulating tank 19 and is further pressed by the powder applying device 15 to thereby form an electrically conductive layer on the cable surface. Then, the cable surface is heated by the heating device 13 to a temperature of preferably 80° to 130° C. to melt the binder in the electrically conductive layer thus formed thereby to make the electrical conductive powder, such as for instance graphite powder, adhere firmly the cable. Thereafter, in order to prevent the deformation of the corrosion-resistant layer during the subsequent heating operation, the surface of the cable is quickly cooled by the cooling device 30.

As is apparent from the above description, the surface electrically conductive layer of the plastic corrosion-resistant cable formed by the method and apparatus according to the invention is uniform. As the electrically conductive powder is made to firmly adhere to the surface of the cable with the aid of the binder, the electrically conductive layer will not come off the cable and is thus formed satisfactorily. In handling the cable thus manufactured, the powder will not scatter and will not stick to the hands of the operator. The manufacturing cost of the cable is relatively low because the formation of the corrosion-resistant layer and the formation of the electrically conductive layer are carried out by a series of devices arranged in a single continuous line.

The features and effects of the method of forming a corrosion-resistant layer and a surface electrical conductive layer on a cable and the apparatus for practicing the method in accordance with the invention are as follows.

(a) The method and apparatus are applicable to PVC, PE or any such plastic corrosion-resistant cables irrespective of the corrosion-resistant layer materials used.

(b) As the electrically conductive layer is formed continuously while the cable is moving, the electrically conductive layer can be formed in succession with the formation of the corrosion-resistant layer.

(c) Since no solvent is used, the method and apparatus are free from environmental danger and no foul order is present. In addition, breakage of the corrosion-resistant layer due to the use of solvent is not a factor.

(d) The electrically conductive layer is uniformly formed. As the electrically conductive powder adheres firmly to the cable with the aid of the binder, the electrically conductive layer will not peel off the cable.

(e) In the case where graphite powder is used as the electrically conductive powder, the cable can be tightly wound on the drum because graphite is slippery.

(f) Even if natural or colored graphite powder is used, no graphite powder sticks to the hand in handling the manufactured cable because the graphite powder adheres to the cable.

(g) The vibrator provided on the side wall of the powder accumulating tank makes it possible to cause the powder to adhere uniformly to the surface of the cable.

(h) Excessive amounts of powder are removed from the cable by the use of one or two powder applying devices. Since this removal of powder is effected before the powder is heated, the powder removed can be used again thereby contributing to the economical use of powder.

(i) As a binder is used, the electrically conductive layer is impervious to oil.

(j) A binder which can be removed by the use of gasoline instead of special solvent can be used.

(k) Since the electrically conductive layer formed is thin, markings can be observed therethrough if a transparent binder is employed.

What is claimed is:

1. A method for forming a surface electrically conductive layer on a polyethylene-jacketed cable comprising the steps of:

providing mixed powder comprising electrically conductive powder and binder powder in a powder accumulating tank forming an accumulated powder layer therein;

passing an unheated cable through said accumulated powder layer to allow said mixed powder to adhere to the polyethylene surface of said cable;

pressing said mixed powder against the surface of said cable at a cable outlet of said powder accumulating tank; and then, heating the surface of said cable with a heating device to melt said binder powder to cause said electrically conductive powder to firmly adhere to the surface of said cable.

2. The method as claimed in claim 1 further comprising the step of pressing the surface of said cable which has passed through said accumulated powder layer with a powder applying device.

3. The method as claimed in claim 1 further comprising the step of blowing air upon the surface of said cable to cool said cable following said step of heating the surface of said cable.

4. The method as claimed in claim 1 further comprising the step of vibrating said mixed powder in said powder accumulating tank.

5. The method as claimed in claim 1 wherein said step of pressing said powder against the surface of said cable at a cable outlet of said powder accumulating tank comprises pressing against the sides of said surface of said cable with a rotating endless powder applying cloth arranged on a rotary unit.

6. The method as claimed in claim 1, 2, 3, 4 or 5 wherein said electrically conductive powder is a mixture of polyethylene powder and graphite powder.

7. A method for forming a corrosion-resistant layer and a surface electrically conductive layer on a metal-sheathed cable comprising the steps of:

passing the cable, without heating it, through an extruder to form a corrosion-resistant polyethylene layer on the cable surface;

then, passing the cable through an accumulating tank containing mixed powder comprising electrically conductive powder and binder powder so that the mixed powder adheres to the corrosion-resistant layer of the cable;

pressing said mixed powder against the surface of said cable at a cable outlet of said powder accumulating tank; and then, heating the surface of said cable to a temperature of 80° C. to 130° C. with a non-contacting heating device to melt said binder powder to cause said electrically conductive powder to firmly adhere to the corrosion-resistant layer of said cable.

8. The method as claimed in claim 7 wherein said electrically conductive powder is a mixture of polyethylene powder and graphite powder.

9. The method as claimed in claim 1 or claim 7 wherein said electrically conductive powder is graphite powder and wherein said binder powder is polyethylene powder.

* * * * *